HOWLET & WALKER.
Preparing Grain for Grinding.
No. 4,813.
Patented Oct. 14, 1846.
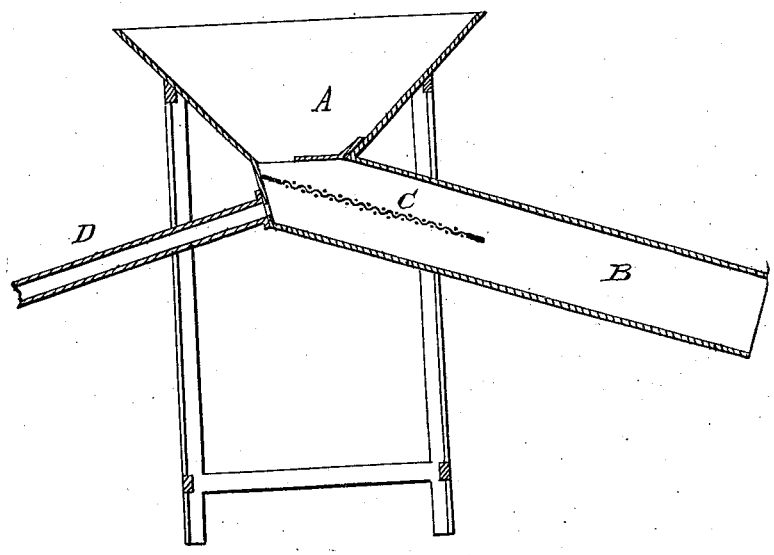

UNITED STATES PATENT OFFICE.

J. W. HOWLET AND F. M. WALKER, OF GREENSBOROUGH, NORTH CAROLINA.

IMPROVEMENT IN PREPARING GRAIN FOR FLOURING.

Specification forming part of Letters Patent No. 4,813, dated October 14, 1846.

*To all whom it may concern:*

Be it known that we, J. W. HOWLET and F. M. WALKER, of Greensborough, in the county of Guilford and State of North Carolina, have invented a new and improved method or process of uniformly toughening the hull or outer covering of wheat and other grain preparatory to converting the grain into flour; and we do hereby declare the following to be a full and exact description of the same, reference being had to the accompanying sectional drawing.

The nature of our invention consists in passing the wheat or grain through a current or jet of steam in any convenient manner, so that each kernel of grain shall be thoroughly acted upon by the steam, which gives to the hull such strength and tenacity that it is not pulverized by the action of the stones in converting the grains into flour, and thereby specking and deteriorating its quality, but is peeled off the wheat in large flakes. The grain may be acted upon as it passes from the smut-machine to the hopper of the flouring-mill by falling through a current of steam issuing from a rose or nozzle, or as it falls from the shoe of the hopper between the stones; or it may be carried from a hopper, A, over a screen, C, secured in a spout, B, against the under side of which a jet of steam impinges from a steam-pipe, D, entering the rear end of spout B, or in any other way which may be thought more convenient by millers.

The utility of toughening the hulls of the grain in some way previous to grinding, and also the difficulty of effecting this desideratum uniformly, is well known to practical millers. When grain is ground in too dry a state, the hull is so tender and brittle that a portion of it is pulverized and passes through the bolt with the flour, disfiguring its appearance and greatly reducing its merchantable value.

What we claim as our invention, and desire to secure by Letters Patent, is—

The method or process of toughening the hulls of wheat and other grains preparatory to grinding by the application of steam, substantially in the manner and for the purpose as herein set forth.

J. W. HOWLET. [L. S.]
F. M. WALKER. [L. S.]

Witnesses:
   JAMES N. ROSS,
   PETER ADAMS.